(12) United States Patent
Veda et al.

(10) Patent No.: US 8,977,698 B2
(45) Date of Patent: Mar. 10, 2015

(54) TAGGING CONTENT WITHIN A NETWORKING ENVIRONMENT BASED UPON RECIPIENTS RECEIVING THE CONTENT

(71) Applicant: Cisco Technology, Inc., San Jose, CA (US)

(72) Inventors: Vishal Veda, Fremont, CA (US); Nithya N. Vijayakumar, Mountian View, CA (US); Namrata Arora, San Jose, CA (US); Keith Griffin, Galway (IE)

(73) Assignee: Cisco Technology, Inc., San Jose, CA (US)

( * ) Notice: Subject to any disclaimer, the term of this patent is extended or adjusted under 35 U.S.C. 154(b) by 264 days.

(21) Appl. No.: 13/690,055

(22) Filed: Nov. 30, 2012

(65) Prior Publication Data
US 2014/0156743 A1 Jun. 5, 2014

(51) Int. Cl.
G06F 15/16 (2006.01)
G06Q 10/10 (2012.01)
G06F 17/30 (2006.01)

(52) U.S. Cl.
CPC .......... *G06Q 10/10* (2013.01); *G06F 17/30864* (2013.01); *G06F 17/30719* (2013.01)
USPC .......................................... 709/206; 709/207

(58) Field of Classification Search
CPC .................... G06F 17/30719; G06F 17/30864
USPC ................................................ 709/206, 207
See application file for complete search history.

(56) References Cited

U.S. PATENT DOCUMENTS

| | | | |
|---|---|---|---|
| 7,797,345 B1 | 9/2010 | Martino et al. | |
| 7,818,392 B1 | 10/2010 | Martino et al. | |
| 7,818,394 B1 | 10/2010 | Lawler et al. | |
| 7,831,684 B1 | 11/2010 | Lawler et al. | |
| 7,844,671 B1 | 11/2010 | Lawler et al. | |
| 7,856,449 B1 | 12/2010 | Martino et al. | |
| 7,860,889 B1 | 12/2010 | Martino et al. | |
| 8,010,619 B1 | 8/2011 | Lawler et al. | |
| 8,364,624 B2 * | 1/2013 | Koponen et al. | 706/47 |
| 8,538,965 B1 * | 9/2013 | Talyansky et al. | 707/736 |
| 8,539,350 B2 * | 9/2013 | Plestid et al. | 715/265 |

(Continued)

OTHER PUBLICATIONS

Braun et al., "People Tagging & Ontology Maturing: Towards Collaborative Competence Management," 8th International Conference on the Design of Cooperative Systems (COOP '08), May 2008, 24 pages.

(Continued)

*Primary Examiner* — Hieu Hoang
(74) *Attorney, Agent, or Firm* — Edell, Shapiro & Finnan, LLC

(57) ABSTRACT

A networking environment accessible by a plurality of computing devices is established to facilitate communications between participants associated with the computing devices, where content is generated and shared by participants via the networking environment. An item of content is shared with a group of recipients associated with computing devices via the networking environment, where the shared item of content includes one or more tags associated with the content, and each tag includes an initial weight value associated with the tag. A relevance factor associated with the group is determined, where the relevance factor is based upon information obtained from profiles of recipients from the group, and the initial weight value of each tag associated with the shared item of content is adjusted based at least in part upon the collective relevance factor associated with the group.

27 Claims, 10 Drawing Sheets

(56) References Cited

U.S. PATENT DOCUMENTS

| | | | |
|---|---|---|---|
| 2004/0093328 A1* | 5/2004 | Damle | 707/3 |
| 2009/0019033 A1* | 1/2009 | Lee et al. | 707/5 |
| 2010/0191740 A1* | 7/2010 | Lu et al. | 707/748 |
| 2010/0205541 A1 | 8/2010 | Rapaport et al. | |
| 2011/0112975 A1 | 5/2011 | McQueen | |
| 2011/0213785 A1 | 9/2011 | Kristiansson et al. | |
| 2011/0320423 A1 | 12/2011 | Gemmell et al. | |
| 2012/0001919 A1 | 1/2012 | Lumer | |
| 2012/0042013 A1 | 2/2012 | Roman et al. | |
| 2012/0084188 A1 | 4/2012 | Zuber | |
| 2012/0166438 A1 | 6/2012 | Wu et al. | |
| 2013/0073473 A1* | 3/2013 | Heath | 705/319 |

OTHER PUBLICATIONS

Spreading Activiation Aug. 8, 2012, [online], [retrieved on Jan. 1, 2013] Retrieved from Wikipedia using Internet <URL: http://en.wikipedia.org/wiki/Spreading_activation> 3 pages.

Mokhtar, et al., "A Self-Organising Directory and Matching Service for Opportunistic Social Networking," SNS'10, Apr. 13, 2010, Paris, France, 6 pages.

SIOC Ontology Sep. 14, 2006, [online], [retrieved on Jul. 18, 2012] Retrieved from SIOC-Project.org using Internet <URL: http://sioc-project.org/ontology> 28 pages.

Web Ontology Language OWL Sep. 6, 2007 [online], [retrieved on Jul. 18, 2012] Retrieved from W3C Semantic Web Activity using Internet <URL: http://www.w3.org/2004/OWL> 3 pages.

International Search Report and Written Opinion in International Application No. PCT/US2013/058675, mailed Dec. 10, 2013, 11 pages.

Marek Ciglan et al., "SGDB—Simple Graph Database Optimized for Activation Spreading Computation", Database Systems for Advanced Applications, 15th International Conference, DASFAA 2010, International Workshops: GDM, BenchmarX, MCIS, SNSMW, DIEW, UDM, Tsukuba, Japan, Apr. 1, 2010, pp. 45-56.

* cited by examiner

TAGGING CONTENT WITHIN A NETWORKING ENVIRONMENT BASED UPON RECIPIENTS RECEIVING THE CONTENT

TECHNICAL FIELD

The present disclosure relates to enhancing the performance of operations within a networking environment and, in particular, enhancing the relevancy of content received by participants within a networking environment.

BACKGROUND

Networking environments, such as collaboration platforms, provide software tools or software application modules and related services linking computing devices to allow users to work together, e.g., in one or more particular settings (e.g., within an enterprise such as a company or organization, or in a collaborative effort between two or more enterprises) in an effort to achieve common goals and strategies. A user or participant in a collaboration platform typically has an account along with a personal profile within the collaboration platform that allows the participant to engage in activities with other participants within the platform.

Content is exchanged between two or more participants within a collaboration platform, where the content can further be posted and accessible by participants (e.g., within communities or other social environments within the platform). The amount of content can be so extensive that it is typically desirable to obtain relevant content efficiently using one or more suitable search engines. The creation of content, the sharing of such content with multiple participants, and the finding of relevant content by searching using keywords are all very important features of a collaboration platform.

Search engines within collaboration platforms typically use tagging associated with the content to determine the relevancy of such content within the search results. Thus, appropriate tagging of content is vital for efficient look up and leveraging of correct information. Tagging of content is typically performed by the content creator. Tags can be created, e.g., based upon keywords, characters or symbols in the content. However, at times content can be mis-tagged, which results in irrelevant information being obtained and disseminated to participants. It is important to ensure that relevant content is obtained and provided to participants within a collaboration platform so as to enhance efficiencies of operation for participants within the platform.

DESCRIPTION OF EXAMPLE EMBODIMENTS

Overview

Figure 1:
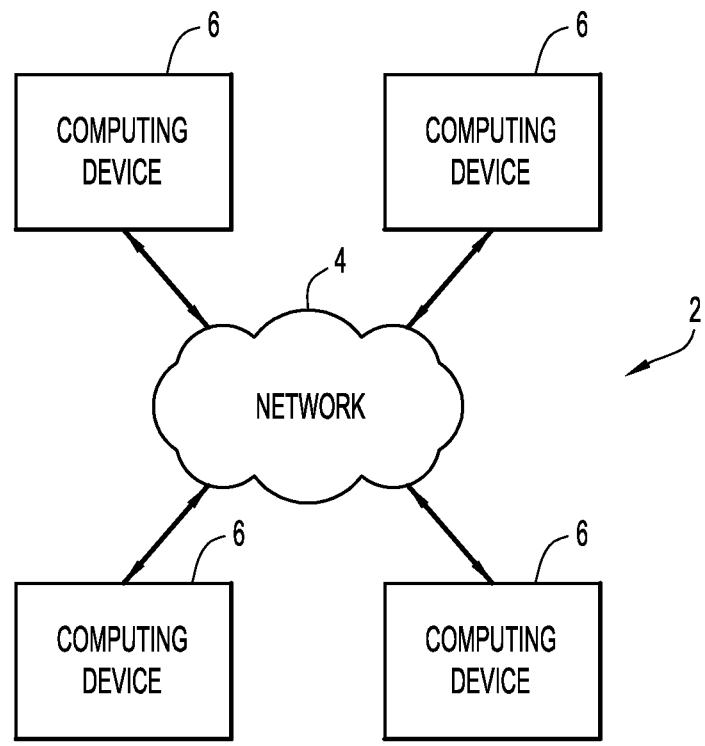
FIG. 1 is a schematic block diagram of an example system in which computing devices are connected to facilitate a networking environment comprising a collaboration platform in which computing devices communicate with each other.

Techniques are presented for establishing a networking environment accessible by a plurality of computing devices to facilitate communications between participants associated with the computing devices, where content is generated and shared by participants via the networking environment. An item of content is shared with a group of recipients associated with computing devices via the networking environment, where the shared item of content includes one or more tags associated with the content, and each tag includes an initial weight value associated with the tag. A relevance factor associated with the group is determined, where the relevance factor is based upon information obtained from profiles of recipients from the group, and the initial weight value of each tag associated with the shared item of content is adjusted based at least in part upon the collective relevance factor associated with the group.

Example Embodiments

Social networking environments are established by computing devices connecting via a suitable platform capable of hosting the environments, where the networking environments facilitate a wide variety of activities and exchanges of communications and content for participants connecting via their computing devices to the networking environment. A collaboration platform is one form of social networking environment that provides software tools or software application modules and related services that link computing devices allowing participants to communicate with each other in a variety of different ways (e.g., via email, instant messaging, audio and/or video conferencing, etc.) and share content (e.g., documents, blogs, or any other types of forms of information) via the platform. For example, the collaboration platforms may allow participants to work together on different projects, e.g., in one or more particular settings (e.g., within an enterprise such as a company or organization, or in a collaborative effort between two or more enterprises) in an effort to achieve common business goals and strategies. The term "tool" is used herein to refer to an "application" software function or set of functions provided by a software application on a computing device and/or hosted on a server on behalf of a computing device. Application modules refer to a set of one or more software applications that provide the software tools used by the computing devices and/or servers.

Some elements or features of a collaboration platform can include messaging (e.g., email, calendaring and scheduling, contact lists, etc.), team collaboration features (e.g., synchronization of documents or files common to a particular community or group associated with the files, including posted or edited web logs or blogs, wikis, other forms of written ideas and/or notes, etc.), and real time or near real time communications (e.g., instant messaging, short messaging service or SMS, web conferencing, white boarding, screen content or desktop sharing, voice, audio and/or video conferencing, etc.). A collaboration platform is particularly useful for large companies, organizations or other entities in that it is designed to facilitate high usage volume between many users (e.g., hundreds or thousands of employees in one or more companies, organizations or groups) as well as multiple simultaneous sessions with different groups or communities of users utilizing the platform.

Referring to FIG. 1, a block diagram is shown for an example system that supports a networking environment, in particular, the support of a collaboration platform, in which a plurality of computing devices communicate and exchange information with each other. In particular, the system 2 comprises a network 4 that facilitates communications and exchange of communications and content between computing devices 6. It is noted that four computing devices 6 are shown for example purposes only. In a collaboration platform, such as an enterprise collaboration platform, the number of computing devices can be any suitable number (e.g., hundreds, thousands or more computing devices). Examples of types of networks that can be utilized within system 2 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

The network 4 can include one or more host servers that include suitable software applications to support the collaboration platform in a client/server relationship with the computing devices 6, where the computing devices also include one or more suitable collaboration software applications that facilitate communications and exchange of information with each other via the host server(s). Alternatively, the collaboration platform can be supported in any other suitable manner, in which one or more computing devices include one or more collaboration software applications that facilitate a suitable connection with other computing devices over the network 4 to provide communications and exchange of information associated with the collaboration platform. Thus, the collaboration platform exists over computing devices (e.g., server computing devices and/or client or end-user computing devices) that connect with each other via the network 4.

Figure 2:
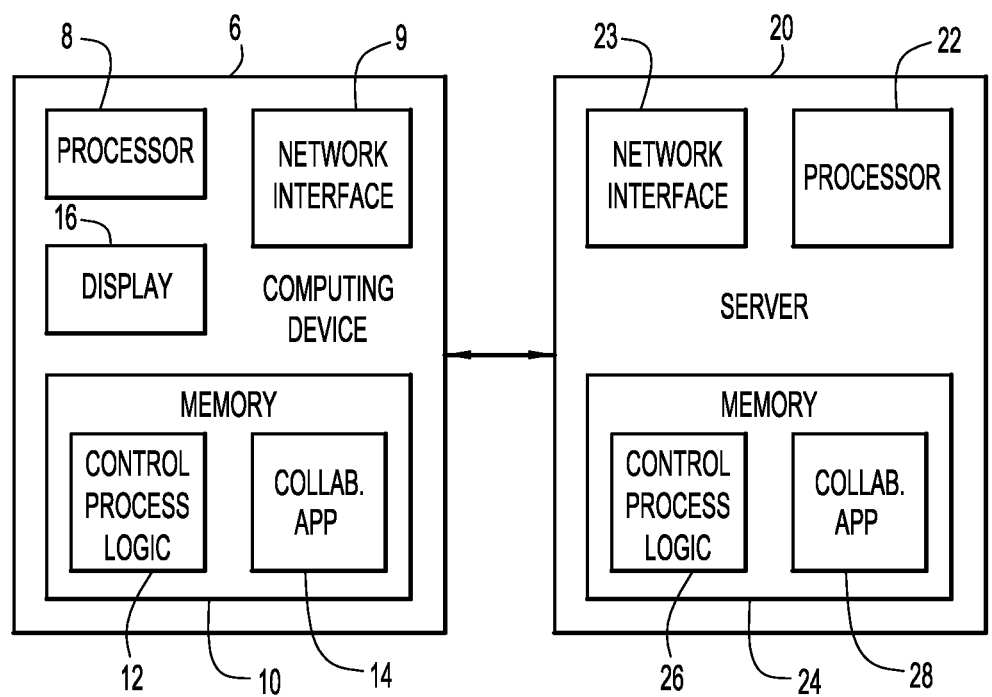
FIG. 2 is a schematic block diagram of an example computing device connected with a server that facilitates operations of the system of FIG. 1 within the collaboration platform.

An example embodiment of a collaboration platform supported by one or more host servers in the network 4 of the system of FIG. 1 is depicted in the block diagram of FIG. 2. In particular, a computing device 6 connects with another computing device comprising a host server 20 to facilitate communications and exchange of information with other computing devices 6 associated with users of the collaboration platform. It is noted that FIG. 2 represents how each computing device 6 of the system of FIG. 1 can connect with a server 20. It is further noted that, while the embodiment of FIG. 2 depicts a single server 20, the system 2 can include multiple servers that support the collaboration platform. Each computing device 6 connects via any suitable wireless and/or hard wired connection to a server 20 to facilitate communications and exchange of information with other computing devices over the network. In particular, each computing device 6 includes a processor 8, a network interface 9, a memory 10, and a display 16. Similarly, the server 20 includes a processor 22, a network interface 23, and memory 24. The computing devices 6 and/or servers 20 can further include any other suitable devices integrated with the devices and/or any other types of peripheral devices that can be connected with the devices to facilitate input of audio, video or other information by a user to the computing device (e.g., keyboards, mouse devices, cameras, microphones, etc.) as well as output or display of audio, video and/or other types of information to the user by the computing device.

The network interfaces 9 and 23 of the computing devices 6 and servers 20 can be, for example, one or more of an Ethernet interface card or switch, a modem, a router or any other suitable hardware device that facilitates a wireless and/or hardwire connection over the network 4 with one or more servers 20 and other computing devices 6, where the network interface unit can be integrated within the device or a peripheral that connects with the device.

Each of the processors 8, 22 can comprise at least one microprocessor that executes control process logic instructions 12, 26 stored within memory 10, 24, including operational instructions and software applications stored within such memory (e.g., applications associated with different types of communications and sharing of information via the collaboration platform).

Figure 3:
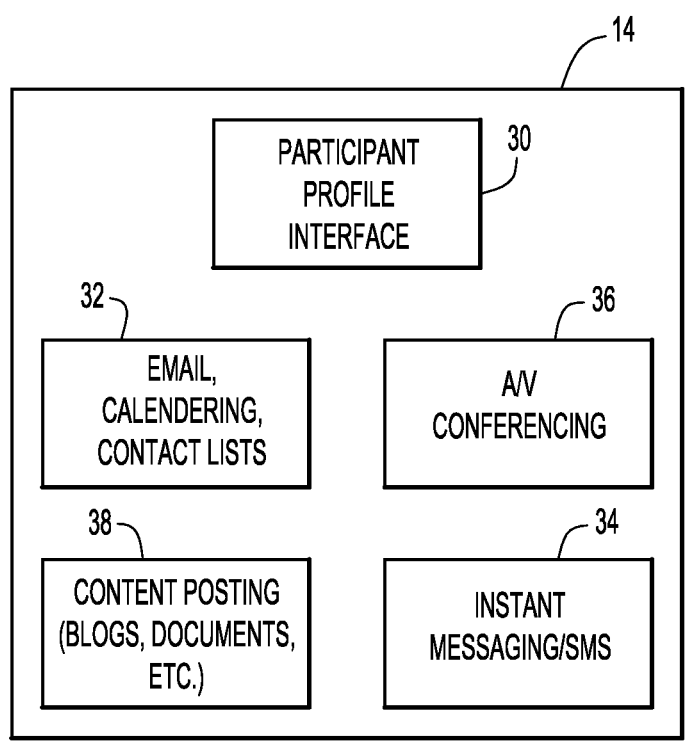
FIG. 3 is a schematic block diagram of an example embodiment of a collaboration application module associated with a computing device of the system of FIG. 1.

For example, the memory 10 of each computing device 6 includes a collaboration application module 14 that comprises one or more software applications that provide software tools to facilitate connection of the computing device 6 to the collaboration platform, via one or more servers 20, and also engage in the various activities associated with the collaboration platform. An example embodiment of a collaboration application module 14 for a computing device 6 is depicted in FIG. 3. The collaboration application module 14 includes software applications that facilitate various types of communications via the collaboration platform, such as messaging application(s) 32 (e.g., email, calendaring and scheduling, contact lists, etc.), instant messaging or SMS application(s) 34, conferencing application(s) 36 that facilitate audio and/or video conferences between the computing device and other computing devices within the platform (including desktop sharing of content from one or more computing devices within the session), and application(s) 38 that facilitate posting of content (e.g., posting of content or editing of such posted content, where the content includes, without limitation, documents, web blogs, wikis and/or any other types of written or graphical information).

The module 14 also includes one or more software applications 30 that provide a participant profile interface displayed by the display 16 of the computing device 6, where the participant profile interface facilitates navigation and interaction by the participant in communications with other participants as well as access to the various types of content provided within the collaboration platform. The participant profile interface further provides information about the participant that may be unique or personalized to the participant, including tags that identify the participant's interests, knowledge, expertise and/or any other characteristics associated with the participant. As used herein, the term "tag" refers to a word, a phrase (e.g., a collection of two or more words) and/or any combination of one or more characters or symbols that provide a level of description to an item of content or provide information about a participant (e.g., a participant's interest, an area of knowledge of a participant, etc.) or a group of participants (e.g., a community) within a collaboration platform or other networking environment.

Tags associated with a participant profile interface 30 can be generated manually by the participant associated with the interface 30 (e.g., the participant manually enters, via the interface 30, tags that have relevance to the participant). Alternatively, or in addition to manual generation, tags associated with a participant can be generated automatically by the platform (e.g., via one or more software applications of the collaboration application module 14 of the participant's computing device 6 and/or a collaboration application module 28 of a server 20), where a participant's activities within the collaboration platform establish tags for the participant (e.g., based upon content viewed by the participant over a given period of time, based upon other participant's the participant most frequently communicates with, etc.). A participant profile interface 30 can further include a tag cloud that lists the participant's tags, where tags can further be weighted (manually and/or automatically) and the weighting of the tags can be visually represented in the tag cloud (e.g., by bolding, underlining, increasing font size, etc.) so as to indicate certain tags have greater priority or significance in relation to other tags. Tags can also be assigned to a group or community of participants in a manner similar to how tags are assigned to individual participants.

Figure 4:
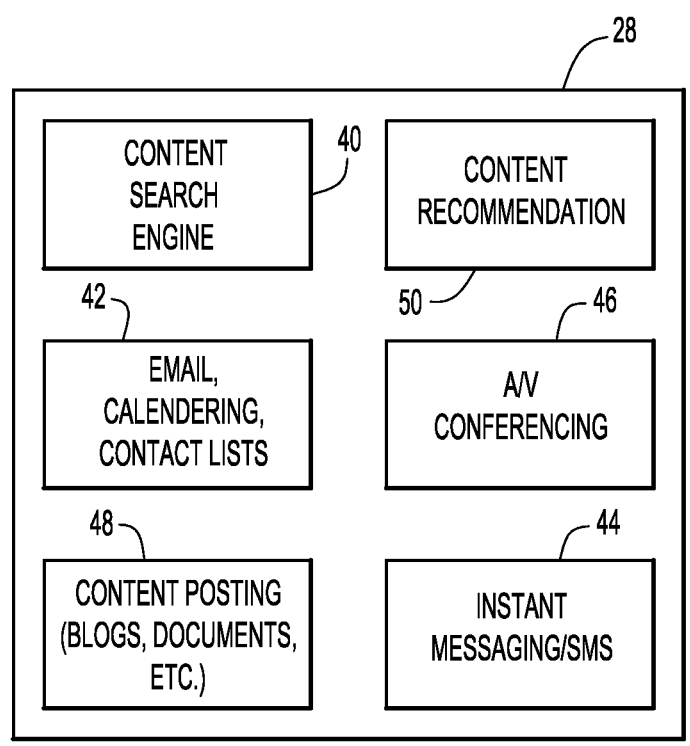
FIG. 4 is a schematic block diagram of an example embodiment of a collaboration application module associated with a server of the system of FIG. 1.

The memory 24 of each server 20 also includes a collaboration application module 28 that comprises one or more software applications that provide software tools to facilitate hosting by the server of the various activities and sharing of content associated with the collaboration platform. An example embodiment of a collaboration application module 28 for a server 20 is depicted in FIG. 4. The collaboration application module 28 for a server 20 includes software applications that facilitate hosting functions for various types of communications between computing devices via the collaboration platform, such as messaging application(s) 42 (e.g., email, calendaring and scheduling, contact lists, etc.), instant messaging or SMS application(s) 44, conferencing application(s) 46 that facilitate audio and/or video conferences between the computing device and other computing devices within the platform (including desktop sharing of content from one or more computing devices within the session), and application(s) 48 that host and/or facilitate storing and editing of posted content (e.g., content that includes, without limitation, documents, web blogs, wikis and/or any other types of written or graphical information).

The module 28 also includes a content search engine 40 comprising one or more software applications that facilitate searching of content within the collaboration platform by one or more computing devices (e.g., via a search function provided within a participant profile interface 30 for a computing device 6). A search can be a keyword search including one or more words or phrases that a participant enters when searching for a particular set of items including content associated with the keyword search. The content search engine 40 utilizes any one or more suitable algorithms to find items of content within the collaboration platform that are potentially relevant to a keyword search. Items of content can have tags associated with the items, where the tags are utilized by the algorithm(s) of the search engine 40 to determine whether such items of content are sufficiently relevant to a keyword search to be listed within search results for the keyword search. The module 28 further includes a content recommendation engine 50 including one or more applications that utilize one or more algorithms to provide a recommendation of the relevancy of items of content, which may be shared by a generator an item of content or found by the search engine 40 in accordance with techniques described herein.

Figure 5:
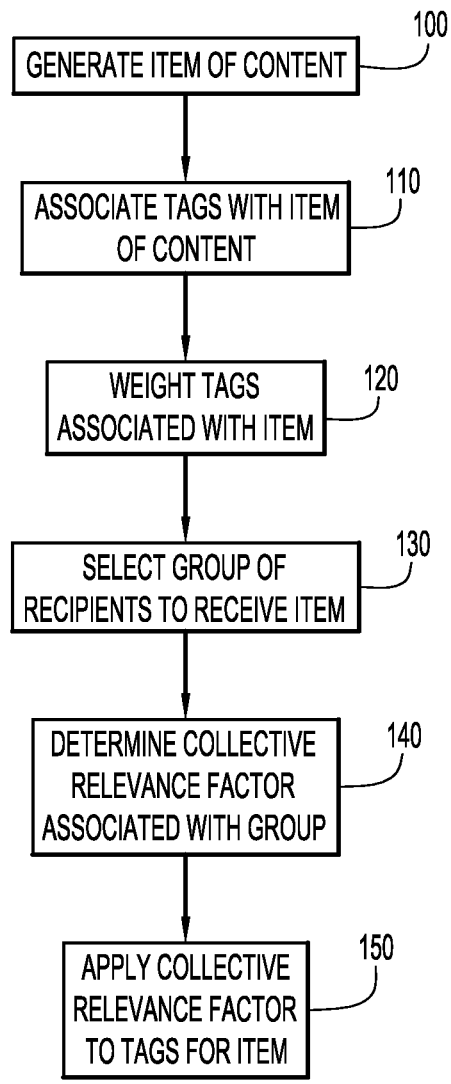
FIG. 5 is a flow chart depicting an example process for generating and weighting tags for content to be shared with a group of participants within the collaboration platform operated by the system of FIG. 1 utilizing the techniques described herein.

The processors 8 and 22 of the computing devices 6 and servers 20 perform operations in accordance with the steps set forth in the flow chart of FIG. 5 utilizing the enterprise collaboration application tools 14, 28, as described further below.

The memories 10, 24 of the computing devices 6 and servers 20 may comprise read only memory (ROM), random access memory (RAM), magnetic disk storage media devices, optical storage media devices, flash memory devices, electrical, optical, or other physical/tangible memory storage devices, and any combinations thereof. The display 16 of each computing device can be an LCD or any other suitable type of display, including touch pad displays (e.g., for tablets, smart phones, or other portable types of computing devices) for display of textual and/or graphical content by the processor 8 of the computing device 6, including video, textual, interactive and/or graphical user interface (GUI) content.

Some examples of computing devices 6 that can be used to engage and participate in an enterprise collaboration platform in system 2 include, without limitation, stationary (e.g., desktop) computers, personal mobile computer devices such as laptops, note pads, tablets, personal data assistant (PDA) devices, and other portable media player devices, and cell phones (e.g., smartphones) including suitable input and output devices as described above. The computing devices and servers can utilize any suitable operating systems (e.g., Android, Windows, Mac OS, Symbian OS, RIM Blackberry OS, Linux, etc.) to facilitate interaction, activities and sharing of information between computing devices via the collaboration platform.

Suitable servers 20 can be any suitable types of stationary or other types of computing devices capable of hosting and managing multiple collaboration sessions of varying types simultaneously as well as large flows of data associated with the collaboration platform. Each server 20 can be configured to provide the function of handling and transferring communication messages (e.g., email messages, audio and/or video conferencing content, instant or SMS messaging, etc.) between two or more computing devices 6 over the network 4. Each server 20 can also be provided with suitable memory capacity to store items of content associated with client communications for each customer device 6 (e.g., saved email messages, instant messaging or SMS communications, and/or audio/video communications, as well as other items of content (e.g., blogs, wikis, white boarding content and/or other types of activities, the sharing of documents, files or other content, e.g., content that is posted and available for access by users of groups or communities within the collaboration platform). In addition, each server 20 can have suitable software tools (e.g., utilizing software applications that are part of the collaboration application module 28 for each server 20) that facilitate the hosting of synchronous communications between the computing devices 6 as well as multiple simultaneous group communications (e.g., the simultaneous hosting of a web conference between a first group of computing devices and an instant messaging communication session between a second group of computing devices).

Thus, the configurations of computing devices 6 and servers 20 as described herein facilitate engagement and interactive participation in activities and other features by users within a networking environment such as a collaboration platform, where the platform can facilitate the forming of groups or communities, in which groups of participants are associated, for the purposes of disseminating items of content or engaging in communications or other activities to participants within a particular group. The groups or communities within the environment can restrict users outside of the group or community from accessing content and/or engaging in communications with users who are designated members of the group or community. Examples of commercial software products and associated services that provide collaboration platforms having the general functional features of providing content for and facilitating communications between participants within a platform as previously described include, without limitation, Cisco WebEx Connect (Cisco Systems, Inc.), Microsoft SharePoint (Microsoft Corporation) and Lotus-Live (IBM Corporation).

As previously described, an item of content within the collaboration platform (e.g., a posted document, a blog or other information posted within the platform) includes one or more tags that provide a description of content associated with the item so as to enable a search engine (such as search engine 40 of the module 28 for a server 20) to determine whether this item has potential relevance in relation to a search for content within the collaboration platform. However, the tags associated with items of content can sometimes mis-identify the relevance of the item of content. The techniques described herein provide further criteria that enhances a determination of relevancy of a particular item of content, in particular an item of content that is at least initially disseminated to a group of recipients within the platform. The enhanced relevancy is achieved by utilizing a collective relevance factor associated with the group of recipients to adjust the relevance of tags associated with the item of content based upon the personal profiles of the participants or other recipients within the group. In an example embodiment, the tags of recipients within the group in which an item of content is disseminated or shared are used to adjust a weighting of the tags already assigned to the item of content. The recipients of an item of content can be individual participants as well as one or more communities. A community within a collaboration platform is a group of participants that have similar goals or interests. A community can further have a personal profile with tags assigned to it in a manner similar to how an individual participant has a personal profile and tags assigned to the participant within the platform.

Operation of the collaboration platform utilizing the system depicted in FIGS. 1-4 so as to enhance the relevancy of an item of content based upon a collective relevancy factor associated with a group of recipients (e.g., participants and/or communities) to which the item of content is shared is now described with reference to the flow chart of FIG. 5. At 100, an item of content is generated for sharing with a group of participants within the collaboration platform. The item of content can be a post, a document, a blog or any other form of written information that is to be shared over the platform. At 110, the item of content has tags associated with the item. Similar to how tags are assigned to recipients, the tags associated with an item of content can be assigned manually, e.g., by the participant generating the item of content, and/or automatically by the collaboration application module 14 of the computing device 6 of the participant generating the item or the collaboration application module 28 of a host server 20 that processes the content for sharing over the platform.

Figure 6:
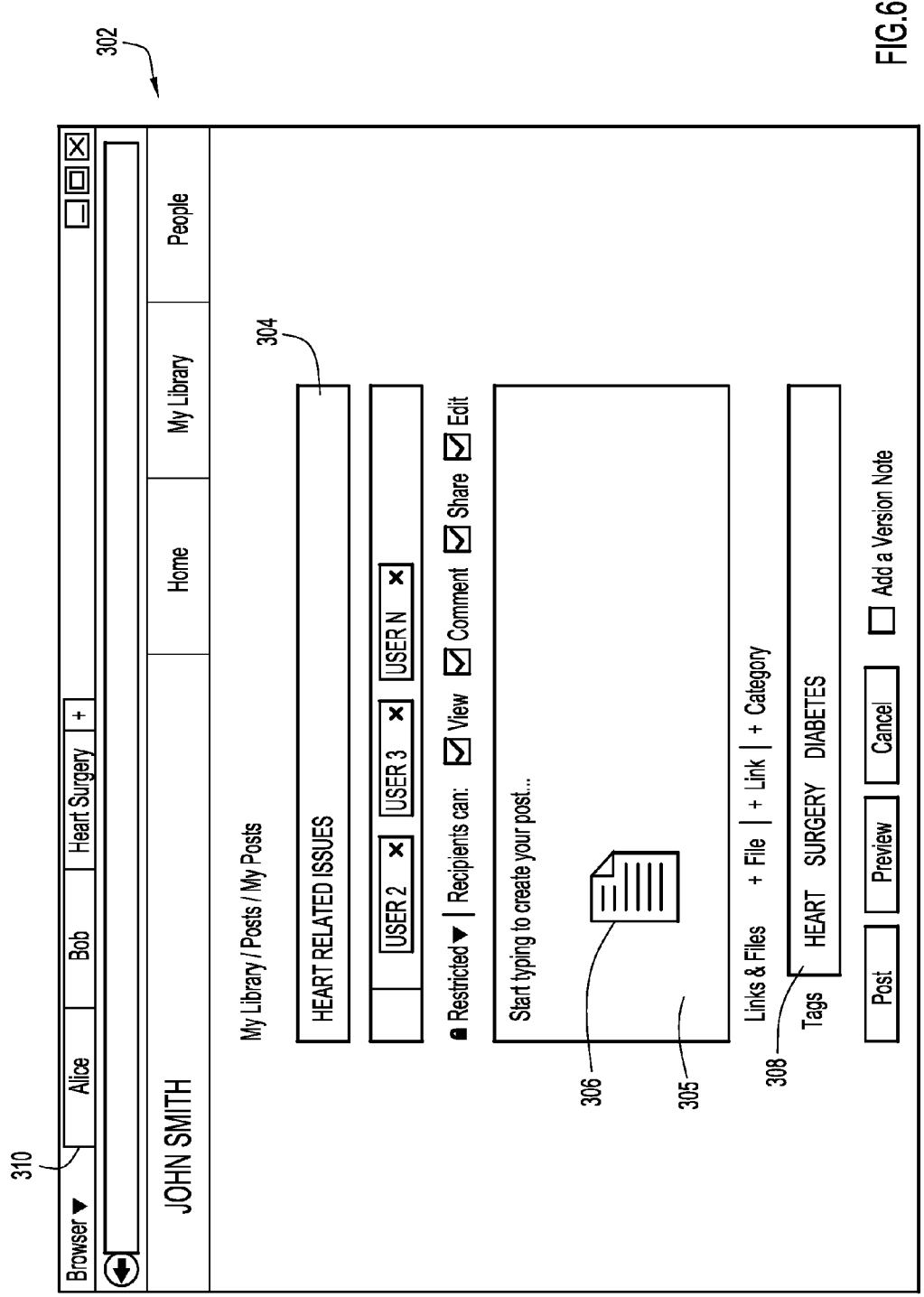
FIGS. 6-10 depict example embodiments of graphical user interfaces for participants within the collaboration platform utilizing the system of FIG. 1 and the techniques described herein.

In an example embodiment a participant generates a post using the participant's interface 30. For example, as depicted in FIG. 6, a participant (John Smith) has an interface within the collaboration platform comprising a graphical user interface (GUI) 302 with a plurality of graphical icons/buttons that provide the participant with the ability to navigate and operate within the collaboration platform, including generation/editing/viewing/sending to recipients of items of content as well as engaging in various forms of communication with other participants. Navigation and posting/accessing of items of content within the collaboration platform via the participant's interface can be achieved utilizing, e.g., a uniform research identifier (URI) scheme. However, any other suitable schemes can also be utilized to facilitate operations by computing devices within the platform. Many general features associated with a GUI or other interface for a participant within a networking environment, such as a collaboration platform, are known and thus are not described in detail herein. Accordingly, a description of GUI 302 is primarily focused on features in relation to the techniques described herein for enhancing tags associated with an item of content using a collective relevance factor associated with the group of recipients to which the item is shared.

As shown in FIG. 6, the participant (John Smith) generates an item of content in the form of a post including content relating to heart related issues, as shown in the title or descriptor of the post set forth in the field 304 of the GUI 302. The participant/content generator can type content within the field 305 and/or attach a document 306 as part of the post. In this example embodiment, the content of the posted item can include written text in the post itself and/or written text in the document attached with the post. As indicated by the title of the post, the content of this item relates information on medical issues associated with the heart. Tags are associated with the item of content and are provided within a field 308 of the GUI 302. The tags for this example embodiment include the following words: heart, surgery and diabetes. As previously noted, these tags can be manually generated, e.g., by the participant who generates the item of content in the collaboration platform (by creating a post) manually adding these tags as part of the post. The tags can also be automatically generated, e.g., by the collaboration application module 14 of the participant's computing device 6 and/or by the collaboration application module 28 of a host server 20 associated with the posting of the item of content within the platform. For example, the content recommendation engine 50 of a host server 20 can recommend or provide tags for the item based upon the relevance and use of words or phrases within the content (e.g., a high frequency of certain words or phrases may be suggested by the recommendation engine 50 as tags).

At 120, the tags associated with the item are prioritized or weighted, e.g., utilizing the recommendation engine 50 of the host server 20. Any suitable algorithm can be applied to weight the tags. In one example embodiment, tags are assigned a weight value (W) based upon a frequency of occurrences of the tag word, phrase or symbol within the content of the item. In the example embodiment of the GUI 302 depicted in FIG. 6, the tags can be assigned weight values based upon the frequency of occurrence of such tag words within the content of the post (e.g., a weight value of 1 may be assigned for every selected number of times a particular word or phrase is identified within the content). An example of assigned tags and their weight values based solely upon content within the item is as follows (shown in List 1):

List 1
1. Heart, W=2
2. Surgery, W=1
3. Diabetes, W=0.5

Thus, the weighting of the tags based solely upon analysis of the content associated with the item prioritizes Heart first, followed by Surgery and then Diabetes. While the example embodiment shows only three tags, any selected number of tags can be assigned to the item (e.g., more or less than 3).

The tags and their weighting for a particular item of content can be used to assess the validity or relevance of the item of content for any number of different scenarios within the collaboration platform. For example, the weighting of tags can be used to prioritize items of content based upon a search for content within the collaboration platform. For example, the weighting of tags for an item of content can be used by a search engine 40 of the host server 20 to prioritize this item of content based upon the search criteria within a search query for content within the collaboration platform (e.g., search criteria relating to heart issues, heart surgery, etc.). Consider a search query such as "information on open heart surgery" within the collaboration platform by a participant. Depending upon the volume of content available within the platform, a search could return a large number of items of content of potential relevance (e.g., hundreds or even thousands of possible search results or hits). The item of content having the tags of List 1 may be prioritized in a search result list at a higher level in relation to one or more other items of content that do not have the tag Heart or Surgery assigned to the other item(s) or having such tags assigned to the other item(s) but with smaller weight values. In contrast, a search query such as "how does diabetes affect the body" may result in this item of content being found in the search result but having a lower priority in relation to other items of content having Diabetes as a tag with a greater weight value.

At 130, a group of recipients are selected for sharing the item of content generated by the participant. For example, the originator or generator of the item of content can choose recipients to which the content is to be shared. Referring again to FIG. 6, the content originator can select recipients within a field 310 of the GUI 302. In this example embodiment, the recipients selected are individual participants Alice and Bob and also a community called Heart Surgery. It is noted that, while the number of recipients selected for sharing of content is three, this is by way of example only and any suitable number of recipients of differing types may be selected (e.g., tens, hundreds, thousands or more recipients of varying types) for a given scenario.

At 140, a collective relevance factor for the group of recipients is determined, e.g., by the recommendation engine 50 of a host server 20. As described herein, the collective relevance factor that is determined is used to adjust tags and weight values of the tags for the item of content. In particular, tags that are associated with the profile of recipients within the group are used to change the weight values and/or add additional tags associated with the item of content.

Figure 7:
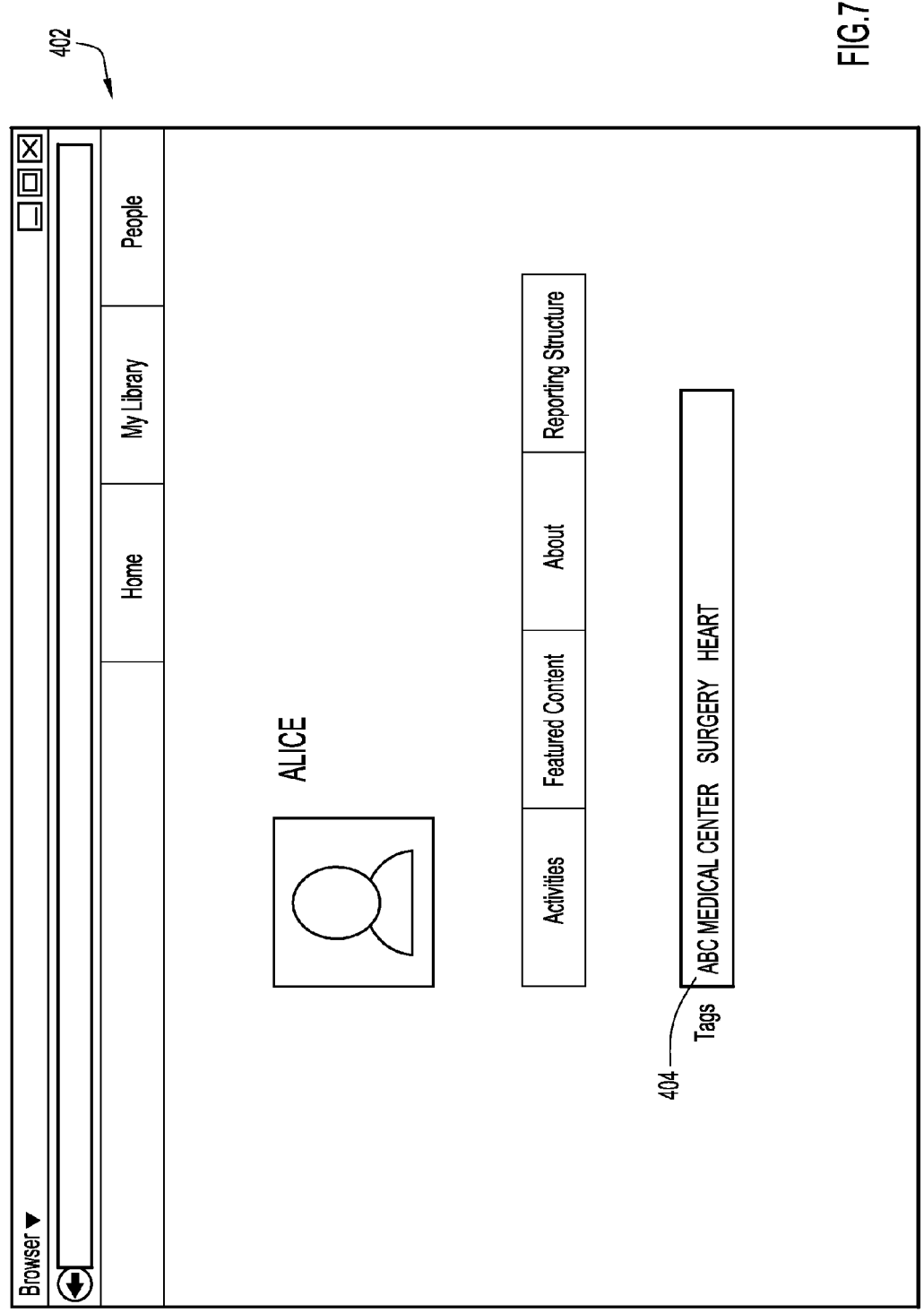

In the example embodiment depicted in FIG. 6, a participant named Alice is designated as one of the recipients to share the item of content generated using the GUI 302. An example embodiment showing the personal profile of Alice within the collaboration platform is depicted as the GUI 402 in FIG. 7. The tags associated with Alice's profile are displayed in a field 404 of the GUI 402 as: ABC Medical Center, Surgery and Heart. As previously noted, tags associated with a recipient's profile (e.g., a participant's personal profile or the profile of a community within the collaboration platform) can be manually generated (e.g., generated by the participant or by an administrator of the community) and/or automatically generated (e.g., based upon expertise, interests, etc. of the participant or participants within the community, as indicated by activities engaged in by the participant or participants within the community within the collaboration platform). The participant Bob can have a similar GUI that provides information about Bob's personal profile, including tags associated with Bob's profile.

The profiles of Bob and Alice are accessible by the recommendation engine 50 so as to be used in determining and applying the collective relevance factor of the group to the tags assigned to the item of content. In addition, the profile, including tags, associated with the community Heart Surgery is also accessible by the recommendation engine 50 for this purpose. The table below depicts an example listing of each recipient in the group and the tags associated with each recipient:

TABLE 1

| First Group of Recipients and Corresponding Tags | | |
|---|---|---|
| Recipient Type | Recipient Name | Associated Tags |
| Participant | Alice | ABC Medical Center, Surgery, Heart |
| Participant | Bob | Heart, Research, ABC Medical Center |
| Community | Heart Surgery | Surgery, Heart |

The collective relevance factor is determined by the recommendation engine 50 and applied to the existing tags associated with the item of content in order to enhance identification of relevancy for the item of content based upon the collective interests of the group (as identified by the group tags). The recommendation engine 50 uses the collective relevance factor associated with the group to modify weight values of the tags associated with item of content as well as to potentially suggest additional tags to be assigned to the item of content (along with a weight value for each additional tag). In particular, one or more algorithms are applied by the recommendation engine 50 to analyze tags associated with the profiles of the recipients, and to further provide weight values associated with such recipient tags.

In an example embodiment, the algorithm(s) applied by the recommendation engine 50 include a determination of collective relevance of tags associated with profiles for the group of recipients based upon identified matches between tags of recipients and tags initially assigned to the item of content. A frequency of occurrences of a match or the same tag used by recipients of the group as a tag assigned to the item of content (e.g., the tag Heart) can be used to adjust the weighting of the item's tag. Referring again to the example of FIGS. 6 and 7, and the recipient tag information provided in Table 1, the tags for all recipients can be combined and a predetermined weight value can be assigned to each tag. Assigning, e.g., a weight value of 0.5 based upon the frequency of occurrences of each tag in the collective group of tags for the recipients, a weight value of such tags can be determined as follows (shown as List 2):

List 2
1. Heart, W=1.5 (since Heart is a tag for 3 recipients)
2. Surgery, W=1 (since Surgery is a tag for 2 recipients)
3. ABC Medical Center, W=1 (since ABC Medical Center is a tag for 2 recipients)
4. Research, W=0.5 (since Research is a tag for 1 recipient)

Upon obtaining a collective relevance factor for tags based upon the group of recipients (e.g., where the tag Heart is assigned a weight value of 1.5 based upon frequency of occurrence with the collective recipient tags, etc.), this collective relevance factor is applied to the tags assigned to the item of content at 150, where the weight values of the tags applied to the item are also modified or adjusted based upon the collective weight values of tags for the group of recipients to which the item is to be shared. The recommendation engine 50 can utilize one or more suitable algorithms to apply the collective relevance factor to the tags associated with the item of content in any suitable manner that takes into account and combines both the current weighting of the tags associated with the item (i.e., the assignment and weighting of tags for the item based solely upon the content associated with the item) and also the weighting of tags (and potential addition of new tags) based upon the collective relevance factor as determined based upon tags associated with profiles of the group recipients.

In the example scenario noted above and associated with FIGS. 6 and 7, Table 1 and Lists 1 and 2, the collective relevance factor (determined at 140) can be applied (at 150) to the current tags by simply adding the weight values for tags together (e.g., adding the weight values together for the same tags of List 1 and List 2). The combined weight values are as follows (shown in List 3):

List 3
1. Heart, W=2+1.5=3.5
2. Surgery, W=1+1=2
3. Diabetes, W=0.5+0=0.5
4. ABC Medical Center, W=0+1=1
5. Research, W=0+0.5=0.5

The tags and tag weight values of List 3 are applied to the item of content and represent an assignment and weighting of tags for the item based upon a combination of relevance associated with the item's content as well as a collective relevance to the particular group of recipients based upon the interests of the group (as identified by the tags associated with the group recipients). As a further feature, the tags of List 3 can be further narrowed to only those tags having weight values at or above a threshold value. For example, if a threshold weight value of 1 is set, then only the following tags in prioritized order would be assigned to the item of content (shown in List 4):

List 4
1. Heart (W=3.5)
2. Surgery (W=2)
3. ABC Medical Center (W=1)

Thus, the collective relevance factor (determined at 140) modifies the weighting of tags and also possibly the group of tags associated with the item of content based upon interests associated with the group of recipients. This results in an enhanced determination of relevance of the item of content in relation to other items of content that may be shared with a group of recipients. In addition, searching performed by a recipient within a group can result in enhanced or improved search results that may be of greater relevance to the recipient. This can significantly improve the prioritizing of search results or shared content, particularly when there are vast amounts of shared items or search results (e.g., hundreds or thousands of items to be shared or returned as potentially relevant as results for a search query).

Figure 8:
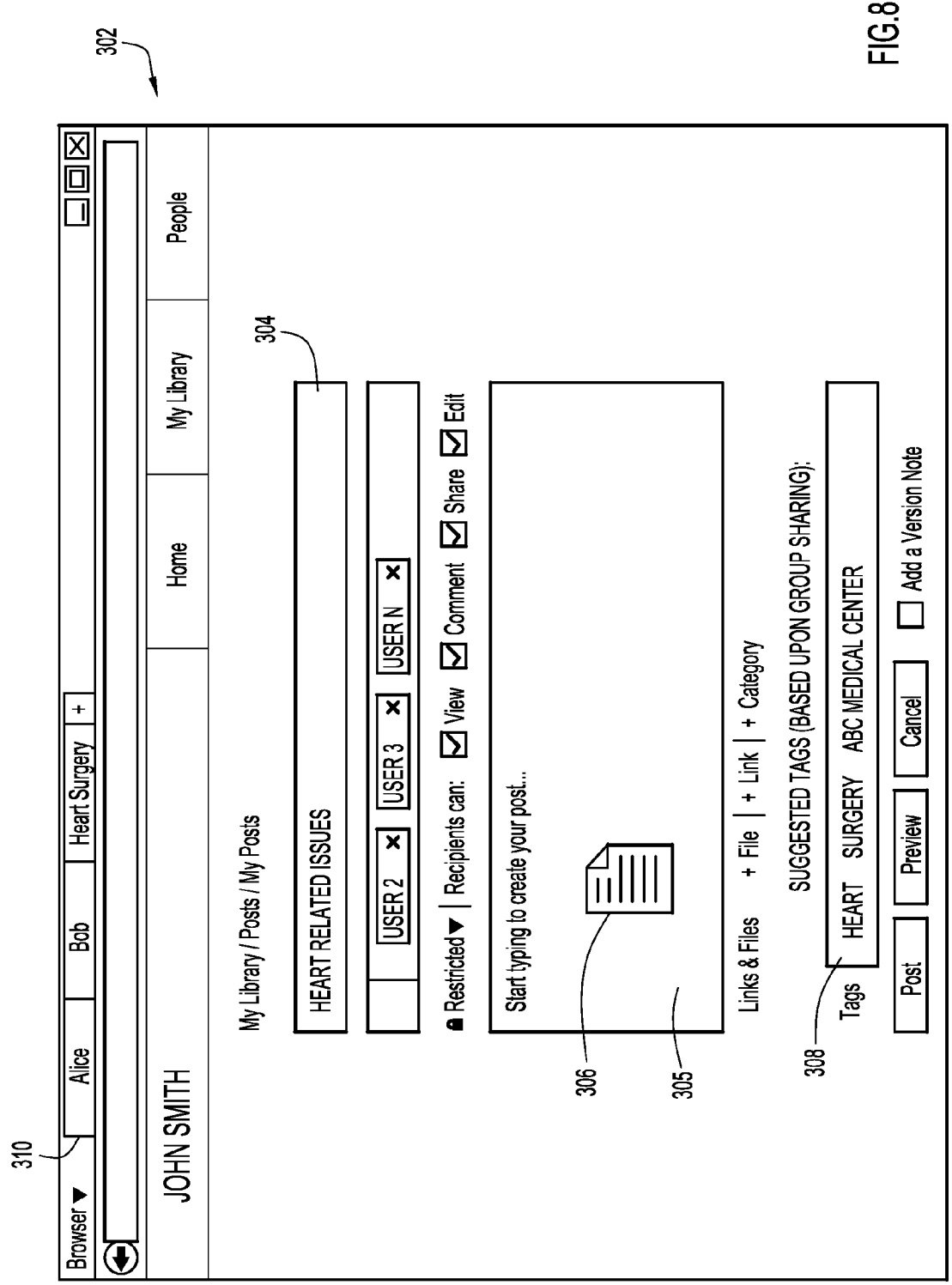

The tags of List 3 or List 4, which are determined by the recommendation engine 50 based upon the group of recipients selected by the generator of the content using GUI 302, can be suggested to the participant/generator of content (John Smith) within the GUI 302 as depicted in FIG. 8. In particular, within the tag field 308, suggested tags are listed using List 4, where the participant/generator of the item of content can be provided with the option of using some or all of these tags. Once the participant has completed the generation of the item of content, finalizes the selection of tags to be assigned to the item of content, and implements sharing of the content, the tags and tag prioritizations are assigned with the item of content for use within the collaboration platform (e.g., by the group or recipients) in relation to establishing relevancy of the item of content in relation to other items of content for a recipient of content.

The collective relevance factor for a group will depend upon a particular group of recipients to which an item of content is being shared. Thus, the final tags and weighting of tags that can be applied to an item of content for the group of recipients to which the item is shared as previously described in relation to FIGS. 6 and 7 (and also Table 1 and Lists 1-4) can be different based upon a different group of recipients designated to share the item of content. This is demonstrated in the next example, in which item of content generated using GUI 302 (FIG. 6) is shared with a different group of recipients as set forth in the following table:

TABLE 2

Second Group of Recipients and Corresponding Tags

| Recipient Type | Recipient Name | Associated Tags |
| --- | --- | --- |
| User | Carl | Mayo Clinic, Diabetes |
| User | David | Heart, Research, Mayo Clinic |
| Community | Medical Breakthroughs | Heart, Brain, Diabetes |

Using the same criteria that was applied to the first group of recipients to determine a collective relevance factor associated with this second group (where each count of a tag within the collective group registers a weight value of 0.5), the following weight values are provided for the tags of the second group (shown in List 5):

List 5
1. Mayo Clinic, W=1
2. Heart, W=1
3. Diabetes, W=1
4. Brain, W=0.5
5. Research, W=0.5

The assignment of tags to the item based solely upon item content is the same as previously set forth in List 1. Applying the collective relevance factor for the second group to the tags of List 1 results in the following, revised tag list (shown in List 6):

List 6
1. Heart, W=2+1=3
2. Surgery, W=1+0=1
3. Diabetes, W=0.5+1=1.5
4. Mayo Clinic, W=0+1=1
5. Research, W=0+0.5=0.5
6. Brain, W=0+0.5=0.5

When narrowing this list of tags to those having weight values at or above a threshold value such as 1, the final tags in prioritized order are as follows (shown in List 7):

List 7
1. Heart (W=3)
2. Diabetes (W=1.5)
3. Surgery (W=1)
4. Mayo Clinic (W=1)

As can be seen from a comparison of List 3 or List 4 with List 6 or List 7, the resultant tag listing and prioritization for the second group is different from the resultant tag listing and prioritization for the first group utilizing the techniques described herein.

The techniques described herein provide more relevant tags for items of content to be shared with a specific group of recipients, since the collective interests of the recipients are used in revising a relevancy for the content with respect to the specific group. The tags that are revised for an item of content to be shared with a group of recipients based upon a collective relevance factor associated with the group is determined by a recommendation engine (e.g., provided at a server) and can be implemented automatically by the recommendation engine or, alternatively, suggested to the generator of the item of content (i.e., providing one or more suggestions for tags and tag prioritization that the generator of the content can either accept or decline). The generator of the content may also be included as one of the recipients in the shared group of recipients so that recipient tags and/or other recipient associated data includes that of the generator of the content. Further, in scenarios in which sharing of an item of content changes (e.g., by adding or removing one or more recipients from an original group), the resultant tags and tag prioritization for the item being shared can also change in accordance with the changing group (e.g., in a manner similar to that previously described in relation to the first and second groups of recipients).

While the examples described herein utilize tags associated with profiles of the recipients in the group, other types of recipient associated data can also be used by a recommendation engine to provide suggested tags and weighting of tags for an item of content to be shared with a group of recipients. In addition, the selection of which tags to choose for a recipient of a group in order to determine the collective relevance factor associated with the group can be enhanced by determining the meaning of the tags in the context of how they are used by the recipients as well as how similar words or phrases are used in the content associated with the item to be shared.

For example, semantic tagging can be utilized to ensure that tags or other recipient associated data accurately corresponds with the tags initially assigned to an item of content (i.e., tags assigned to an item based solely upon the content associated with the item). In particular, semantic tagging involves assigning tags with a specific meaning or a semantic meaning (a meaning based upon the semantics in which the tag is used). This can be achieved, e.g., by identifying each tag with a specific uniform resource identifier (URI) so as to relate it to a specific meaning (e.g., by linking the tag to a specific definition of the tag via the URI). By relating a tag to a specific meaning in this (or some other suitable) manner, the accuracy of a tag can be ensured particularly for tags that may have two or more different semantic meanings. The assigned semantic meaning for a recipient tag can be compared with a defined meaning for the same tag (i.e., a tag having the same one or more words, letters, symbols, etc.) that is associated with an item of content in order to determine whether the tags are in fact a match based upon their intended meanings.

An example of a tag that may have different semantic meanings depending upon how it is used or the content or recipient the tag is associated with is the term "Mayo". As used in the previous example for the second group of recipients, the tag Mayo Clinic was a relevant tag associated with the item of content relating to heart related issues. The Mayo Clinic is a well known U.S. healthcare provider, and thus would likely have relevance to the content of issues relating to the heart. However, the term "Mayo" could have different meanings depending upon the context in which this term is used. For example, Mayo is also a county in the country of Ireland. If a recipient has the tag "Mayo" associated with it and that recipient happens to reside in Mayo, Ireland, it is possible this tag is of little or no relevance to the item to be shared with this recipient. By assigning the tag for "Mayo" in this context with a specific semantic meaning (e.g., using a specific URI associated with the tag "Mayo Clinic" for each recipient having such tag in its profile, so that a tag "Mayo" for a recipient that is identified by its URI as relating to the Mayo Clinic could be distinguished from the same tag "Mayo" for a recipient that is identified by its URI as indicating a location in which the recipient resides), a better understanding of the meaning of the term in relation to the context of how it is being used can be obtained by the recommendation engine in order to determine whether such tag is truly relevant to the item of content. Therefore, semantic tagging enhances the ability of the recommendation engine to select appropriate tags from a list of tags associated with a recipient of the group having the greatest potential relevance to the tags associated with the content of the item.

The meaning of tags within the context of a group of recipients and in relation to an item of content (e.g., a post and/or a document) can also be enhanced by automatic/machine learning and/or natural language processing techniques (e.g., using algorithms of the recommendation engine). For example, in a series of posts, where a conversation is being developed in relation to certain content, tags associated with group recipients of the content can be matched based upon the same or similar meanings between the tags and words or phrases that are commonly used within the posts.

Another feature that can be provided in relation to the techniques described herein relates to the automatic recommendation of further recipients to add to the group to which the item of content is to be shared, where additional recipients can be suggested in response to the resultant tags (and weighting of the tags) being applied to the item based upon the combination of item content and collective relevance factor of the current group of recipients. In an example embodiment, the recommendation engine 50 can examine any directory of participants within the collaboration platform, such as a directory of participants, communities, etc. associated with the profile of the participant generating the content (e.g., John Smith's directory) or any other available groupings of participants or communities. In the event the recommendation engine finds one or more participants, communities or other groupings of participants within the collaboration platform having a high frequency of tags determined as potentially relevant to the resultant tags assigned the item of content to be shared with the current group of recipients, the recommendation engine can suggest such participants, communities, etc. to the participant generating the content to be added to the current share group of recipients.

Figure 9:
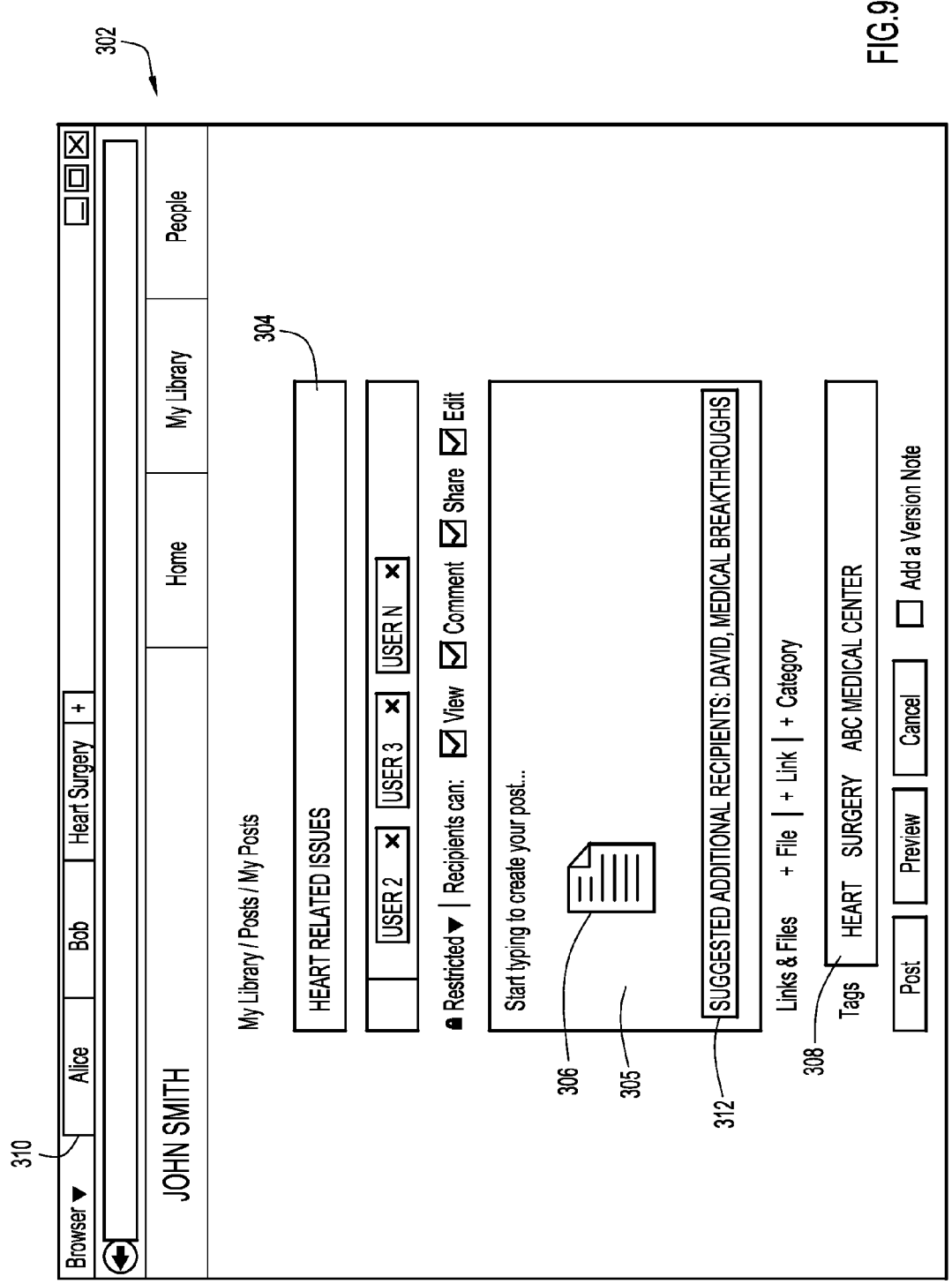

An example embodiment of this feature is now described with reference to FIGS. 8-10. In the previous example scenario involving the first group of recipients (Table 1), in which the resultant tags recommended by the recommendation engine 50 (and implemented in relation to the item of content by the participant/generator of the item of content) are Heart, Surgery and ABC Medical Center (with weight factors according to List 4), the recommendation engine 50 can further scan one or more directories of participants, communities, etc. (e.g., directories associated with the generator of the item of content) to determine whether any would be possible candidates for adding to the recipient list based upon their associated tags.

For example, one directory that may be considered would be the second group listed in Table 2. The recommendation engine 50 may consider, e.g., David (a participant) and Medical Breakthroughs (a community) from the second group as potentially relevant candidates to add to the recipient list (e.g., based upon the tags associated with these two potential recipients matching closely with at least some of the tags assigned to the item of content). As depicted in FIG. 9, the recommendation engine can suggest, via a field 312 within the GUI 302 of the participant/generator of the item of content, the additional recipients (David and Medical Breakthroughs) determined as potentially relevant candidates. The participant can select, via a suitable icon/button within the GUI 302, whether to add such additional recipients to the group of recipients with which the item of content will be shared. In the event the participant selects the suggested additional recipients, those recipients are added to the group of recipients as shown by the GUI 302 in FIG. 10. In addition, the recommendation engine can further revise the tags associated with the item of content based upon the revised group of recipients (i.e., the collective relevance factor may change when considering the tags of the additional recipients), and the tag revision can be implemented automatically or suggested to and then implemented by the participant/generator of the item of content. Utilizing the techniques as described herein in relation to recipient groups 1 and 2, a change in tags (if implemented) due to the additional recipients would result as follows (shown in List 8):

List 8
1. Heart, W=4.5
2. Surgery, W=2
3. Diabetes, W=1
4. ABC Medical Center, W=1
5. Research, W=1
6. Mayo Clinic, W=0.5
7. Brian, W=0.5

Figure 10:
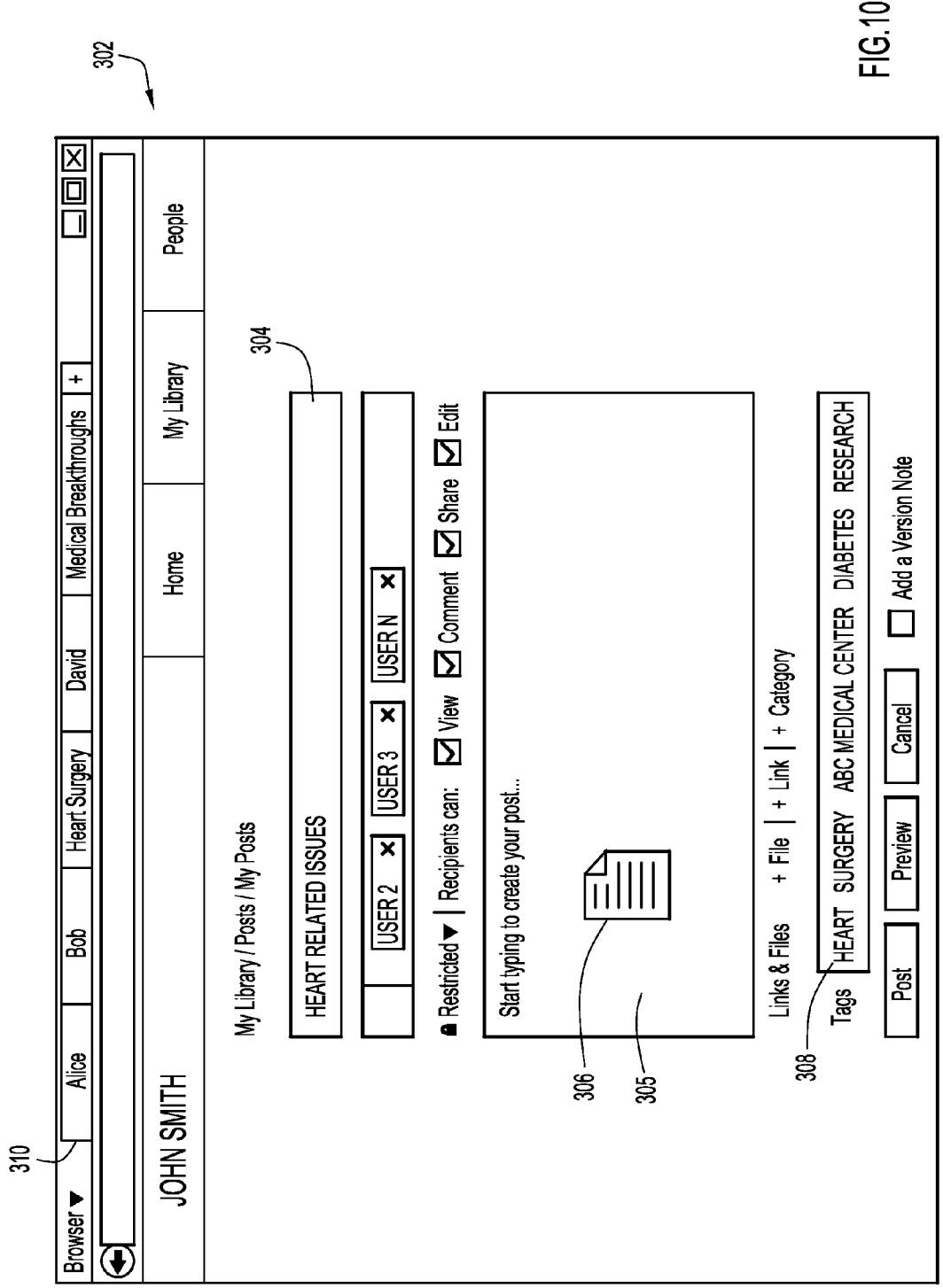

If the threshold weight value is 1 for tags to be applied to the item of content, the only tags applied to the item of content are Heart, Surgery, Diabetes, ABC Medical Center, and Research (as shown by the tags listed in the field 308 of FIG. 10). The addition of recipients to the group results in a change in the tags, where the weight value for certain tags increases, and this results in additional tags being applied to the item of content.

It is noted that the addition of recipients can be either automatic or manually controlled by the participant generating the content (e.g., the participant must choose to accept recommended additional recipients via the participant's GUI). In embodiments in which the addition of recipients is performed automatically, a limitation or control factor can be implemented (e.g., limiting the number of additional recipients from the original selected group of recipients) so as to prevent any potential for expansion of the group of recipients and further revision of the collective relevance factor (tags and weighting of tags) associated with the item of content significantly from the initial selection of recipients by the participant sharing the content.

The techniques described herein enhance the relevancy of tags assigned to content within a networking environment such as a collaboration platform, thus rendering more effective communication of content within the environment that may be relevant to recipients of such content. By utilizing tags or other recipient information to obtain a collective relevancy factor for the group of recipients designated to share an item of content, the tags associated with the item of content can be modified so as facilitate more meaningful searches for content and increasing the likelihood that an item of content having greater relevance to a particular recipient is viewed by such recipient. This becomes highly effective in networking environments in which there are vast amounts of content and it can become difficult for a participant within the environment to filter through items of content that are more likely to be relevant to the participant in relation to other items of content that may be less relevant to the participant.

The above description is intended by way of example only.

What is claimed is:

1. A method comprising:
   establishing a networking environment accessible by a plurality of computing devices to facilitate communications between participants associated with the computing devices, wherein content is generated and shared by participants via the networking environment;
   sharing an item of content with a group of recipients associated with computing devices via the networking environment, wherein the shared item of content includes one or more tags associated with the content, and each tag includes an initial weight value associated with the tag;
   determining a relevance factor associated with the group, wherein the relevance factor is based upon information obtained from profiles of recipients from the group; and
   adjusting the initial weight value of each tag associated with the shared item of content based at least in part upon the relevance factor associated with the group.

2. The method of claim 1, wherein the initial weight value for each tag associated with the shared item of content is generated based upon a frequency of occurrence of the tag within the shared item of content, and the relevance factor associated with the group is determined by:
   assigning group weight values to tags associated with the profiles of recipients associated with the group based upon a frequency of occurrence of each tag with the recipient profiles.

3. The method of claim 2, wherein the adjusting the weight value of each tag associated with the shared item of content further comprises:
   matching tags associated with the profiles of recipients with tags for the shared item of content; and
   for each matched tag, combining the group weight value with the initial weight value associated with the matched tag.

4. The method of claim 3, further comprising:
   identifying a semantic meaning for each tag associated with each recipient profile;
   wherein a matched tag is identified in response to the semantic meaning of a tag of a recipient profile corresponding with a meaning of a tag associated with the shared item of content.

5. The method of claim 1, further comprising:
   associating additional tags with the shared item of content based upon tags obtained from profiles of recipients from the group.

6. The method of claim 1, further comprising:
   sharing with a second group of recipients associated with computing devices via the networking environment the item of content previously shared with the group of recipients;
   determining a second relevance factor associated with the second group, wherein the second relevance factor is based upon information obtained from profiles of recipients from the second group; and
   adjusting the initial weight value of each tag associated with the shared item of content for the second group based at least in part upon the second relevance factor associated with the second group, wherein the adjusted weight value of at least one tag based upon the second relevance factor of the second group differs from the adjusted weight value of the at least one tag based upon the relevance factor of the group.

7. The method of claim 1, further comprising:
   automatically recommending at least one further recipient to add to the group of recipients.

8. The method of claim 7, wherein automatically recommending at least one further recipient further comprises:
   finding the at least one further recipient based upon a comparison of tags associated with a profile for the at least one further recipient and tags associated with the item of content.

9. The method of claim 7, further comprising, in response to addition of the at least one further recipient to the group of recipients so as to form a revised group of recipients:
   determining a revised relevance factor associated with the revised group of recipients, wherein the revised relevance factor is based upon the relevance factor as well as information obtained from at least one profile of the at least one further recipient; and modifying the adjusted weight value of each tag associated with the shared item of content based at least in part upon the revised relevance factor associated with the revised group.

10. An apparatus comprising:
a memory configured to store instructions including one or more applications that monitor items of content provided to one or more groups of recipients within a networking environment, wherein the networking environment is accessible by a plurality of computing devices to facilitate communications between participants associated with the computing devices, and content is generated and shared by participants via the networking environment; and
a processor configured to execute and control operations of the one or more applications so as to:
analyze an item of content shared with a group of recipients associated with computing devices via the networking environment, wherein the shared item of content includes one or more tags associated with the content, and each tag includes an initial weight value associated with the tag;
determine a relevance factor associated with the group, wherein the relevance factor is based upon information obtained from profiles of recipients from the group; and
adjust the initial weight value of each tag associated with the shared item of content based at least in part upon the relevance factor associated with the group.

11. The apparatus of claim 10, wherein the initial weight value is generated for each tag associated with the shared item of content based upon a frequency of occurrence of the tag within the shared item of content, and the processor is further configured to determine the relevance factor associated with the group by assigning group weight values to tags associated with the profiles of recipients associated with the group based upon a frequency of occurrence of each tag with the recipient profiles.

12. The apparatus of claim 11, wherein the adjusting the weight value of each tag associated with the shared item of content further comprises:
matching tags associated with the profiles of recipients with tags for the shared item of content; and
for each matched tag, combining the group weight value with the initial weight value associated with the matched tag.

13. The apparatus of claim 12, wherein the processor is further configured to execute and control operations of the one or more applications so as to:
identify a semantic meaning for each tag associated with each recipient profile;
wherein a matched tag is identified in response to the semantic meaning of a tag of a recipient profile corresponding with a meaning of a tag associated with the shared item of content.

14. The apparatus of claim 10, wherein the processor is further configured to execute and control operations of the one or more applications so as to:
associate additional tags with the shared item of content based upon tags obtained from profiles of recipients from the group.

15. The apparatus of claim 10, wherein the processor is further configured to execute and control operations of the one or more applications so as to:
in response to the item of content being shared with a second group of recipients associated with computing devices via the networking environment, determine a second relevance factor associated with the second group, wherein the second relevance factor is based upon information obtained from profiles of recipients from the second group; and
adjust the initial weight value of each tag associated with the shared item of content for the second group based at least in part upon the second relevance factor associated with the second group, wherein the adjusted weight value of at least one tag based upon the second relevance factor of the second group differs from the adjusted weight value of the at least one tag based upon the relevance factor of the first group.

16. The apparatus of claim 10, wherein the processor is further configured to execute and control operations of the one or more applications so as to:
recommend at least one further recipient to add to the group of recipients.

17. The apparatus of claim 16, wherein the processor is further configured to execute and control operations of the one or more applications so as to:
find the at least one further recipient based upon a comparison of tags associated with a profile for the at least one further recipient and tags associated with the item of content.

18. The apparatus of claim 16, wherein the processor is further configured to execute and control operations of the one or more applications so as to, in response to addition of the at least one further recipient to the group of recipients so as to form a revised group of recipients:
determine a revised relevance factor associated with the revised group of recipients, wherein the revised relevance factor is based upon the relevance factor as well as information obtained from at least one profile of the at least one further recipient; and
modify the adjusted weight value of each tag associated with the shared item of content based at least in part upon the revised relevance factor associated with the revised group.

19. One or more computer readable storage devices encoded with software comprising computer executable instructions and when the software is executed operable to:
establish a networking environment accessible by a plurality of computing devices to facilitate communications between participants associated with the computing devices, wherein content is generated and shared by participants via the networking environment;
share an item of content with a group of recipients associated with computing devices via the networking environment, wherein the shared item of content includes one or more tags associated with the content, and each tag includes an initial weight value associated with the tag;
determine a relevance factor associated with the group, wherein the relevance factor is based upon information obtained from profiles of recipients from the group; and
adjust the initial weight value of each tag associated with the shared item of content based at least in part upon the relevance factor associated with the group.

20. The one or more computer readable storage devices of claim 19, wherein the initial weight value for each tag associated with the shared item of content is generated based upon a frequency of occurrence of the tag within the shared item of content, and the instructions are operable to determine the relevance factor associated with the group by:
assigning group weight values to tags associated with the profiles of recipients associated with the group based upon a frequency of occurrence of each tag with the recipient profiles.

21. The one or more computer readable storage devices of claim 20, wherein the instructions are operable to adjust the weight value of each tag associated with the shared item of content by:
    matching tags associated with the profiles of recipients with tags for the shared item of content; and
    for each matched tag, combining the group weight value with the initial weight value associated with the matched tag.

22. The one or more computer readable storage devices of claim 21, wherein the instructions are further operable to:
    identify a semantic meaning for each tag associated with each recipient profile;
    wherein a matched tag is identified in response to the semantic meaning of a tag of a recipient profile corresponding with a meaning of a tag associated with the shared item of content.

23. The one or more computer readable storage devices of claim 19, wherein the instructions are further operable to:
    associate additional tags with the shared item of content based upon tags obtained from profiles of recipients from the group.

24. The one or more computer readable storage devices of claim 19, wherein the instructions are further operable to:
    share with a second group of recipients associated with computing devices via the networking environment the item of content previously shared with the group of recipients;
    determine a second relevance factor associated with the second group, wherein the second relevance factor is based upon information obtained from profiles of recipients from the second group; and
    adjust the initial weight value of each tag associated with the shared item of content for the second group based at least in part upon the second relevance factor associated with the second group, wherein the adjusted weight value of at least one tag based upon the second relevance factor of the second group differs from the adjusted weight value of the at least one tag based upon the relevance factor of the first group.

25. The one or more computer readable storage devices of claim 19, wherein the instructions are further operable to:
    recommend at least one further recipient to add to the group of recipients.

26. The one or more computer readable storage devices of claim 25, wherein the instructions are operable to recommend at least one further recipient by:
    finding the at least one further recipient based upon a comparison of tags associated with a profile for the at least one further recipient and tags associated with the item of content.

27. The one or more computer readable storage devices of claim 26, wherein the instructions are further operable to, in response to addition of the at least one further recipient to the group of recipients so as to form a revised group of recipients:
    determine a revised relevance factor associated with the revised group of recipients, wherein the revised relevance factor is based upon the relevance factor as well as information obtained from at least one profile of the at least one further recipient; and
    modify the adjusted weight value of each tag associated with the shared item of content based at least in part upon the revised relevance factor associated with the revised group.

* * * * *